(12) United States Patent
Chengson et al.

(10) Patent No.: US 7,061,939 B1
(45) Date of Patent: Jun. 13, 2006

(54) SOURCE SYNCHRONOUS LINK WITH CLOCK RECOVERY AND BIT SKEW ALIGNMENT

(75) Inventors: David Chengson, Scotts Valley, CA (US); Joel Frederick Darnauer, Mountain View, CA (US); Matthew A. Tucker, San Francisco, CA (US)

(73) Assignee: Juniper Networs, Inc., Sunnyvale, CA (US)

( * ) Notice: Subject to any disclaimer, the term of this patent is extended or adjusted under 35 U.S.C. 154(b) by 854 days.

(21) Appl. No.: 09/879,176

(22) Filed: Jun. 13, 2001

(51) Int. Cl.
*H04J 3/06* (2006.01)
(52) U.S. Cl. ..................... 370/503; 375/359
(58) Field of Classification Search ............ 370/366, 370/503, 506, 509, 516, 518, 535, 537, 538, 370/540; 375/219, 257, 356, 359, 360; 398/139, 398/154, 155
See application file for complete search history.

(56) References Cited

U.S. PATENT DOCUMENTS

| | | | | |
|---|---|---|---|---|
| 5,446,765 A | * | 8/1995 | Leger | 375/359 |
| 5,878,061 A | * | 3/1999 | Hauck et al. | 714/800 |
| 6,233,294 B1 | * | 5/2001 | Bowers et al. | 375/356 |
| 6,323,793 B1 | * | 11/2001 | Howald et al. | 341/137 |
| 6,493,359 B1 | * | 12/2002 | Sorgi et al. | 370/506 |
| 6,549,595 B1 | * | 4/2003 | Den Besten et al. | 375/360 |
| 6,618,395 B1 | * | 9/2003 | Kimmitt | 370/473 |
| 6,667,993 B1 | * | 12/2003 | Lippett et al. | 370/509 |
| 6,667,994 B1 | * | 12/2003 | Farhan | 370/535 |
| 6,680,970 B1 | * | 1/2004 | Mejia | 375/225 |
| 6,738,392 B1 | * | 5/2004 | Thurston | 370/503 |
| 6,754,235 B1 | * | 6/2004 | Van Der Putten et al. | 370/503 |

OTHER PUBLICATIONS

U.S. Appl. No. 10/120,443, filed Apr. 12, 2002; Kong Kritayakirana et al.; Systems and Methods for Routing Data in a Network Device; 28 pages.

* cited by examiner

*Primary Examiner*—Steven Nguyen
*Assistant Examiner*—Clemence Han
(74) *Attorney, Agent, or Firm*—Harrity Snyder LLP

(57) ABSTRACT

A high speed transmission system transfers data streams over a plurality of data links. Each data link may carry a number of bit streams. On the transmitting end, multiplexers serialize the bit streams, which are then transmitted to the receiving end. A clock signal is not transmitted over the optical link. Instead, an indication of the appropriate clock signal frequency and phase is embedded in the transmitted data. At the receiving end, a clock recovery circuit generates a clock signal of an appropriate frequency and phase based on the embedded indication. The new clock signal is used to sample and reconstruct the original data streams.

29 Claims, 5 Drawing Sheets

SOURCE SYNCHRONOUS LINK WITH CLOCK RECOVERY AND BIT SKEW ALIGNMENT

BACKGROUND OF THE INVENTION

A. Field of the Invention

The present invention relates generally to high-speed data transmission, and more particularly, to a source synchronous data transmission link.

B. Description of Related Art

Conventional communication systems typically use either synchronous or asynchronous data transmission to transmit data from a transmitting system to a receiving system. Synchronous data transmission requires the transmitting and receiving systems to be synchronized with each other.

Conventional synchronous data transfer has the characteristic of requiring relatively constant time periods between successive events. Keeping time periods relatively constant, such as the time between successive bits, allows end systems to stay synchronized because the timing of successive events is predetermined.

To implement synchronous data transfer, the transmitting and receiving systems can be synchronized in a variety of ways. In some synchronous data transmission systems, for example, the transmitting and receiving ends share a common master clock. Because the end systems are synchronized with each other, synchronizing information does not need to be sent with the data. Although synchronous data transfer has many advantages, the precise clocks and timing requirements are very costly.

For asynchronous data transfer, data can be transmitted at irregular intervals. There is no clocking signal in asynchronous data transfer. Transferring data at irregular intervals, however, requires insertion of start and stop bits to mark the beginning and end, respectively, of the data stream. The receiving system uses the start and stop bits to determine when data is being received. Thus, although asynchronous data transfer is less costly in terms of clocks and maintaining timing, it lowers bandwidth because of the overhead of start and stops bits in the transmitted data. Therefore, conventional synchronous and asynchronous data transmission systems each have disadvantageous.

Accordingly, it is desirable to efficiently transmit data signals between devices without the disadvantages of conventional synchronous or asynchronous data transmission systems.

SUMMARY OF THE INVENTION

Systems and methods consistent with the invention address, among other things, the need to efficiently transmit data by improving the density of links connecting a plurality of signals.

In one aspect, the principles of the invention are directed to a communication method that includes receiving data from data lines, each data line providing data at a predetermined rate, and serializing the received data. Additionally, the serialized data is provided through a optical link and deserialized. The deserialized data is provided to second data lines corresponding to the first data lines.

A second aspect of the principles of the present invention is directed to a communication system that includes input data signal lines carrying data transmitted synchronously with a first clock signal running at a predetermined frequency. A plurality of multiplexers are each configured to receive a subset of the input data signal lines and to combine data received on the subset of data signal lines into combined signals. At least one of the multiplexers receiving, as the subset of the data signal lines, a first of the data signal lines and a compliment of the first of the data signal lines. Demultiplexers convert the combined signals to data signals on output data signal lines based on a second clock signal, and a clock recovery circuit provide the demultiplexers with the second clock signal based on the combined signals.

Another aspect of the principles of the present invention is directed to a network device for transmitting information over a link. The network device comprises a first multiplexer connected to data lines, the first multiplexer combining data signals from the data lines and a second multiplexer including a first input connected to the data lines, a second input connected to a compliment of the first input, and an output, the second multiplexer combining data signals from the first and second inputs. Further, transmitters are connected to the outputs of the first and second multiplexers, the transmitters receive the combined data signals from the first and second multiplexers and transmit the combined data signals to a link.

Another network device consistent with the principles of the present invention receives information. Receivers are connected to a link, the receivers receiving the information from the link and converting the information to first data signals and transmitting the data signals on data lines. A first demultiplexer is connected to the data lines, the demultiplexer converting the first data signals into second and third data signals, and outputting the second data signal based on a clock signal and outputting the third data signal based on the clock signal. A clock recovery circuit is connected to the data lines, the clock recovery circuit generating the clock signal based on the first data signals and providing the clock signal to the demultiplexer. Finally, a receiver is connected to receive the second and third data signals, the receiver analyzing the second and third data signals for the presence of a predetermined pattern and using the predetermined pattern to align bits in the second and third data signals.

Additional aspects of the principles of the invention are evident from the following description and the claims.

BRIEF DESCRIPTION OF THE DRAWINGS

The accompanying drawings, which are incorporated in and constitute a part of this specification, illustrate the principles of the invention and, together with the description, explain principles of the invention. In the drawings.

DETAILED DESCRIPTION

The following detailed description of the invention refers to the accompanying drawings. The same reference numbers are sometimes used in different drawings to identify the same or similar elements. Also, the following detailed description does not limit the invention. Instead, the scope of the invention is defined by the appended claims and equivalents of the claim limitations.

As described herein, a transmission system converts a plurality of synchronous signals for transmission onto a physical link. In one embodiment, transmission bandwidth is increased by embedding a clock signal in the converted signals.

Figure 1:
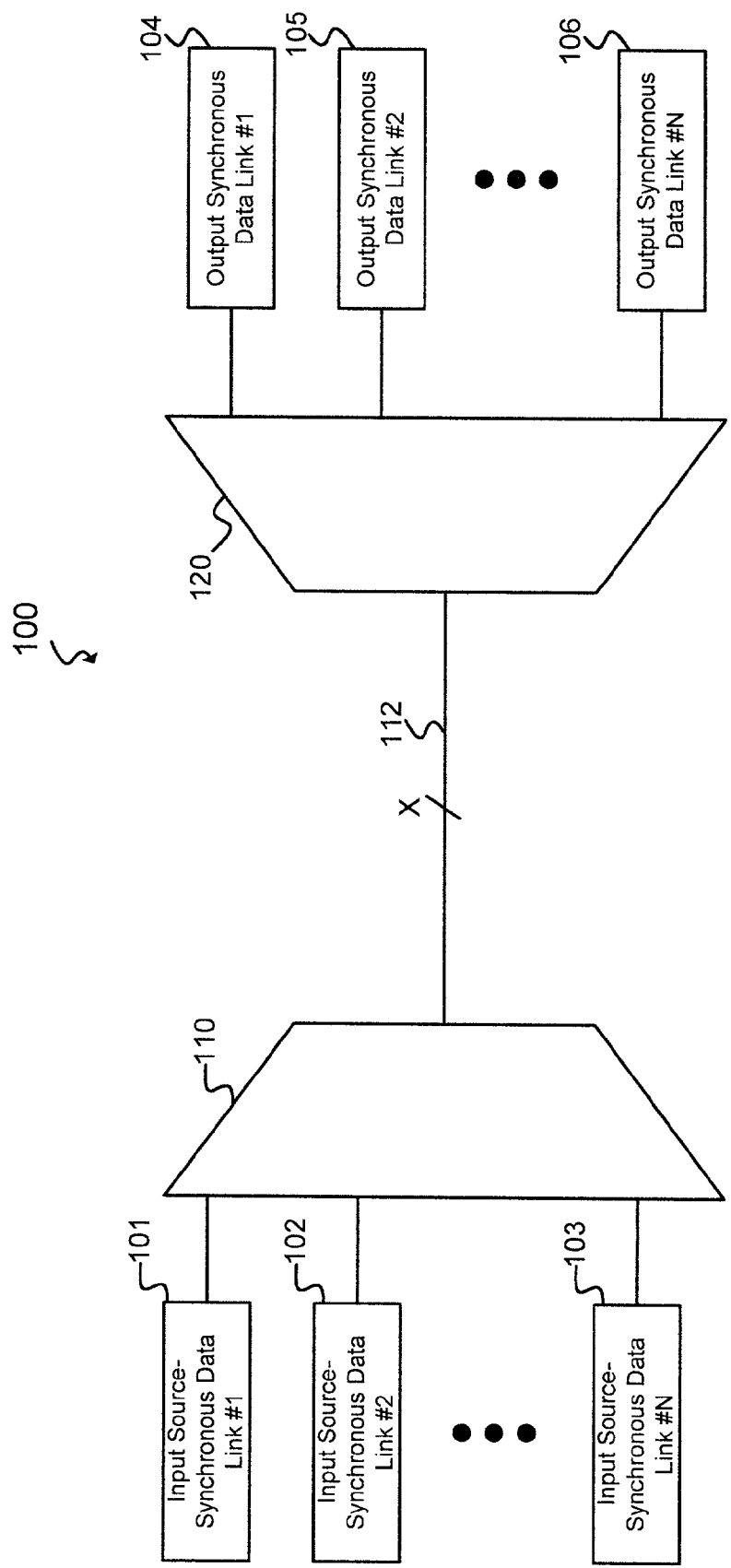
FIG. 1 is a block diagram illustrating a data transmission system consistent with the principles of the invention.

FIG. 1 is a block diagram illustrating a data transmission system 100 consistent with the principles of the invention. Data transmission system 100 includes N input synchronous data links 101–103, a multiplexing unit 110, a link 112, a demultiplexing unit 120, and N output synchronous data links 104–106. Each data link 101–103 may carry data signals transmitted synchronously with a clock signal. Multiplexing unit 110 combines data streams from data links 101–103 into single streams and transmits the single streams over link 112. In one embodiment, link 112 is an optical link containing a number of optical fibers. Demultiplexing unit 120 demultiplexes the single streams received from optical link 112 and outputs the demultiplexed data on output data links 104–106.

Figure 2:
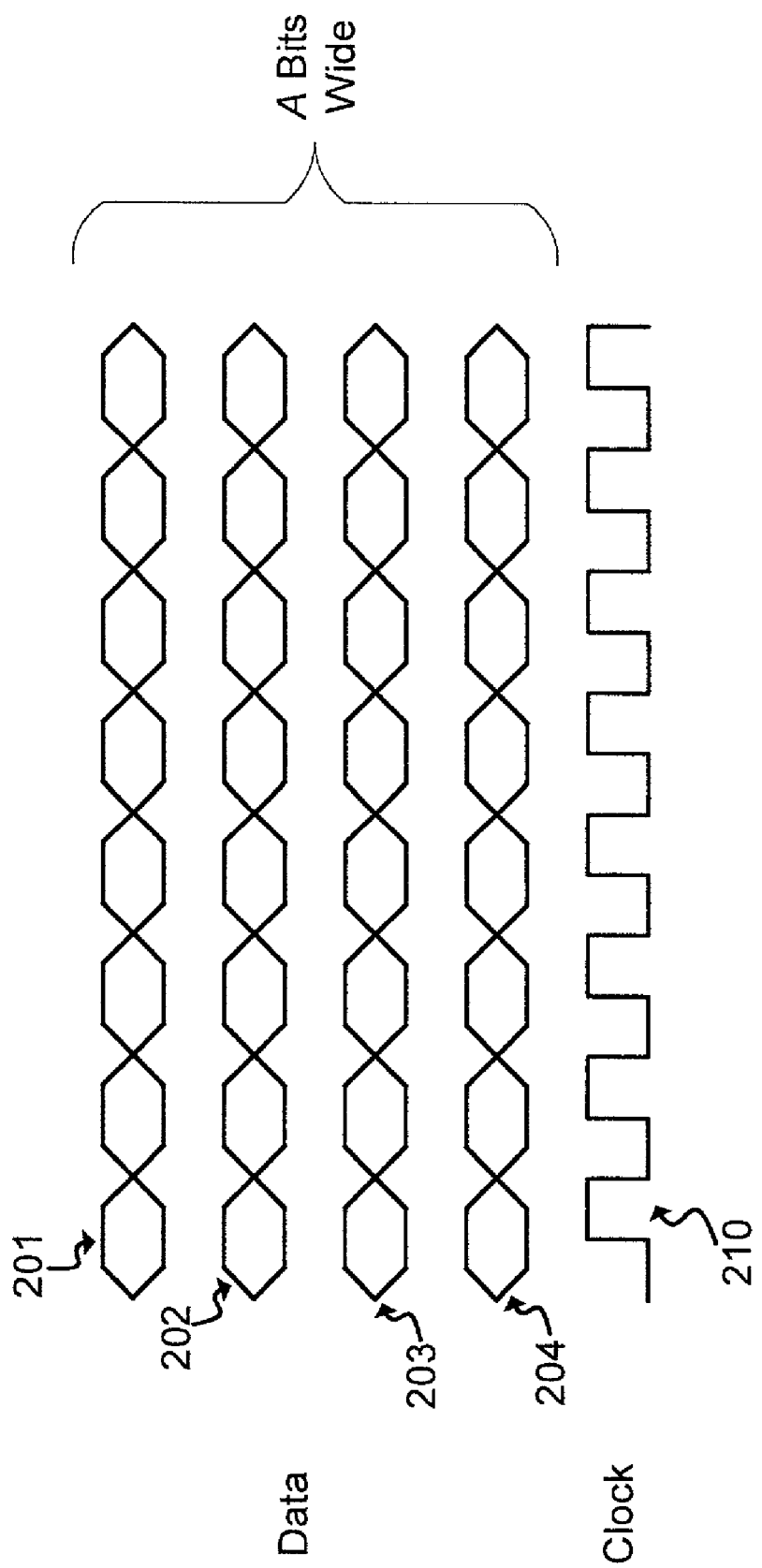
FIG. 2 is a diagram illustrating an example of input data links from FIG. 1.

FIG. 2 is a diagram illustrating an example of data bit streams and clock signals for one of data links 101–103. In the illustrated embodiment, there are four data bit streams 201–204 and a clock signal 210. Data bit streams 201–204 are transmitted synchronously with clock signal 210. In the illustrated embodiment, for each clock cycle, bit streams 201–204 together define an A-bit wide data word, where A in the embodiment of FIG. 2 is four. In an embodiment having three data links (N=3), there would be twelve (N·A) bits of information transmitted per clock cycle.

In one embodiment, clock signal 210 of each of data links 101–103 is an independent clock signal running at the same frequency as the clock signals (or a multiple of the frequency of the clock signals) for the other data links. Each clock signal 210 may, however, be an independent clock signal in which the phase of each clock relative to each other may vary.

Returning to FIG. 1, multiplexing unit 110 may perform a number of functions, including combining multiple data bit streams 201–204 and transmitting the combined streams on link 112. Clock signal 210 is not transmitted over link 112. Instead, multiplexing unit 110 embeds an indication of clock signal 210 in the transmitted data bits. Some bits may be scrambled and have a probabilistic embedding of the clock signal that is preset in data bit streams 201–204. Demultiplexing unit 120 recovers the clock signal and demultiplexes the combined data streams into output data links 104–106. By not sending clock signal 112 over link 112, clock skew which may have otherwise been introduced by link 112 is avoided and fewer pins may be used.

In one embodiment, multiplexing unit 110 is implemented within a first physical chassis, such as a router chassis, and demultiplexer unit 120 is implemented within a second physical chassis, such as a second router chassis. In this embodiment, link 112 connects the two router chassis.

Figure 3:
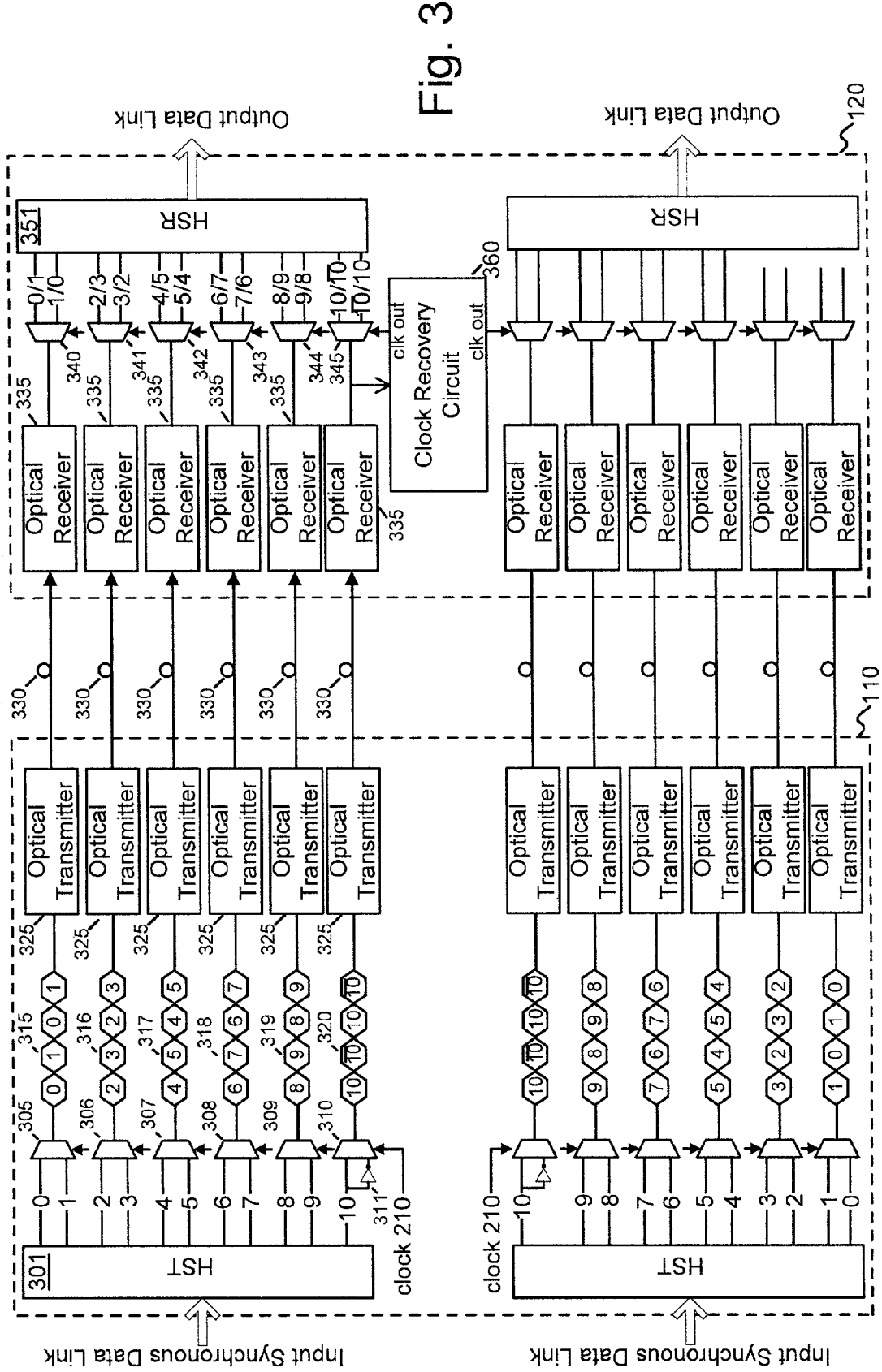
FIG. 3 is diagram illustrating examples of portions of the electrical-optical data transmission system of FIG. 1.

Multiplexing unit 110, demultiplexing unit 120, and link 112 will now be described with reference to FIG. 3. In FIG. 3, two synchronous data links are illustrated, each eleven bit streams wide (i.e., A=11), labeled as bit lines zero through ten. The description of FIG. 3 describes the upper input synchronous data link. The lower synchronous data link operates in a similar manner.

High speed transmitter (HST) 301 receives bit streams from a data link, such as data link 101, processes the bit streams, and forwards the bit streams to multiplexers 305–310. The bit streams are combined by multiplexers 305–310, converted into optical signals by optical transmitters 325, transmitted over optical fibers 330, converted back to an electrical signal by optical receivers 335, and processed and reassembled into the original data by demultiplexers 340–345 and high speed receiver (HSR) 351.

Multiplexing unit 110 and demultiplexing unit 120 may additionally include corresponding scramblers (not shown) and descramblers (not shown), respectively, to scramble data transmitted over fibers 330.

Each of multiplexers 305–309 receives from HST 301 two bit streams of the eleven incoming bit streams and combines the two bit streams into combined bit streams 315–319. In one embodiment, multiplexers 305–309 interleave each input bit stream. For example, bit stream 315 contains alternating bits from bit stream number zero and bit stream number one, and is clocked at twice the frequency of the signals entering HST 301. For example, the bit streams received by HST 301 and multiplexers 305–310 may be clocked at 937 million bits per second (Mbps) while the data transmitted from multiplexers 305–310 may be clocked at 1874 Mbps.

Multiplexer 310 operates slightly differently than multiplexers 305–309. Multiplexer 310 receives only one bit stream directly, bit stream 10. The input to multiplexer 310 includes an inverter 311. Accordingly, bit stream 320 alternates between the bit value of bit stream 10 and its complement. Because each bit is followed by its complement, bit stream 320 is guaranteed to include an edge every other clock signal.

Although bit streams 315–320 are illustrated in FIG. 3 as a multiplexed stream made from two constituent streams, in alternate implementations three or more streams may be combined into a single stream.

The optical transceiving system that includes optical transmitters 325, optical fibers 330, and optical receivers 335 transmit the combined data streams 315–320 to demultiplexing unit 120. More particularly, optical transmitters 325 receive the combined data streams 315 through 320 and convert the electrical signals into optical signals for transmission over optical fibers 330. The optical signals, after traveling over the optical fibers 330, are converted back to electrical signals by optical receivers 335.

The clock signal is not transmitted over optical fibers 330. Instead, clock recovery circuit 360 derives a clock signal based on combined stream 320 after it is output by the optical receiver 335 carrying combined stream 320. Because each bit in signal 320 is followed by its complement, the signal includes an edge every other clock cycle. Clock recovery circuit 360 uses the presence of the regularly repeating edge to determine the clock frequency and the phase of the clock for the transmitted data. More particularly, clock recovery circuit 360 derives from combined stream 320 a clock out signal having the same frequency as the transmitting clock and in phase with combined data stream 320.

The clock out signal may be shared by both HSR 351 and the lower HSR shown in FIG. 3. The clock out signal generated by clock recovery circuit 360 is input to demultiplexers 340–345, which receive the combined data streams 315–320 from optical receivers 335. Based on the clock out signal, demultiplexers 340–345 separate the combined data streams into the constituent bit streams zero through ten, and the complement of bit stream 10. The deserialization process may cause pairs of data bits, such as 0/1, 2/3, and 4/5, to become transposed.

Although clock recovery circuit 360 aligns the phase of the clock signal at the receiving end to the input data, the bit streams transmitted between HST 301 and HSR 351 may become misaligned with one another because, for example, the fiber may have different lengths and transmission properties. To address this potential problem, and to correct bit transposition, HST 301 and HSR 351 may periodically transmit preestablished alignment patterns that both HST 301 and HSR 351 recognize. Based on the received pattern, HSR 351 can check to ensure that all of its received bit streams are aligned and realign bit streams if necessary.

Figure 4:
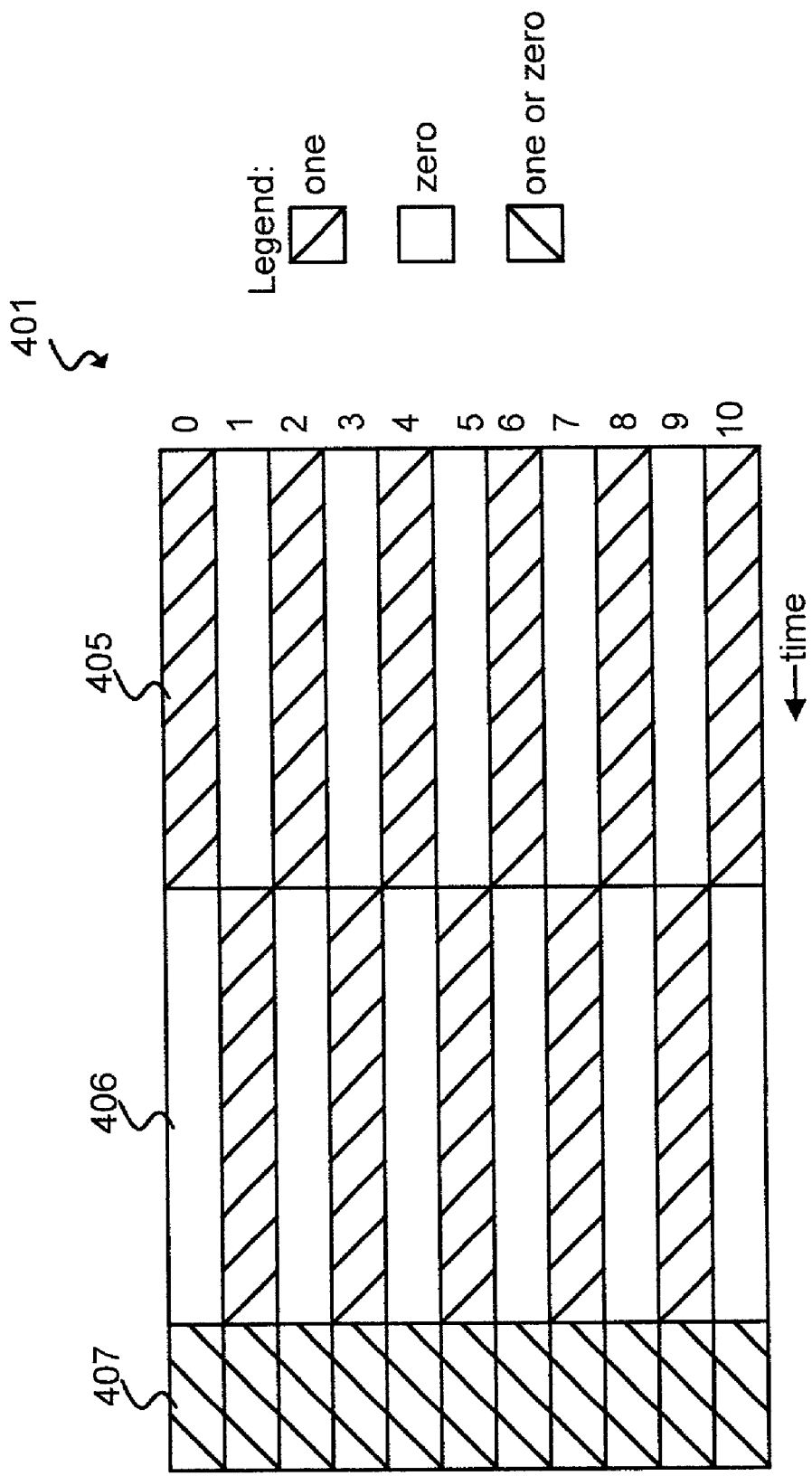
FIG. 4 is a diagram illustrating an exemplary alignment pattern for aligning received data bits consistent with the principles of the invention.

FIG. 4 is a diagram illustrating an exemplary alignment pattern 401 that may be used by HST 301 and HSR 351 consistent with the principles of the invention. Pattern 401 may have the property of being easily detected in the presence of skew and bit transposition. The pattern includes for each bit stream in the data link a number of consecutive bits 405 (e.g., 6) followed by an equal number of consecutive complementary bits 406. In one embodiment the pattern alternates between consecutive bit streams. Thus, as shown in FIG. 4, the pattern for bit streams 0, 2, 4, 6, 8, and 10 is a series of logic ones followed by a series of logic zeroes, while the pattern for bit streams 1, 3, 5, 7, and 9 is a series of logic zeroes followed by a series of logic ones. After the second series of bits, the pattern may include a message 407 such as a cyclic redundancy check (CRC) message.

In operation, HSR 351 monitors the incoming bit streams for any pattern which could have been a transmitted pattern 401 that was altered by bit skew or transposition of bits. Upon detecting the pattern, HSR 351 determines whether bit streams 0–10 are aligned. If any of the streams are out of alignment, such as if bit stream zero is shifted relative to bit stream one, HSR 351 adjusts bit stream state buffers within HSR 351 to align the bits to form pattern 401. To this end, HSR 351 may store recovered bits from each line in a FIFO (first-in-first-out) queue, each FIFO having a separate read pointer and having the ability to transpose adjacent bits.

Figure 5:
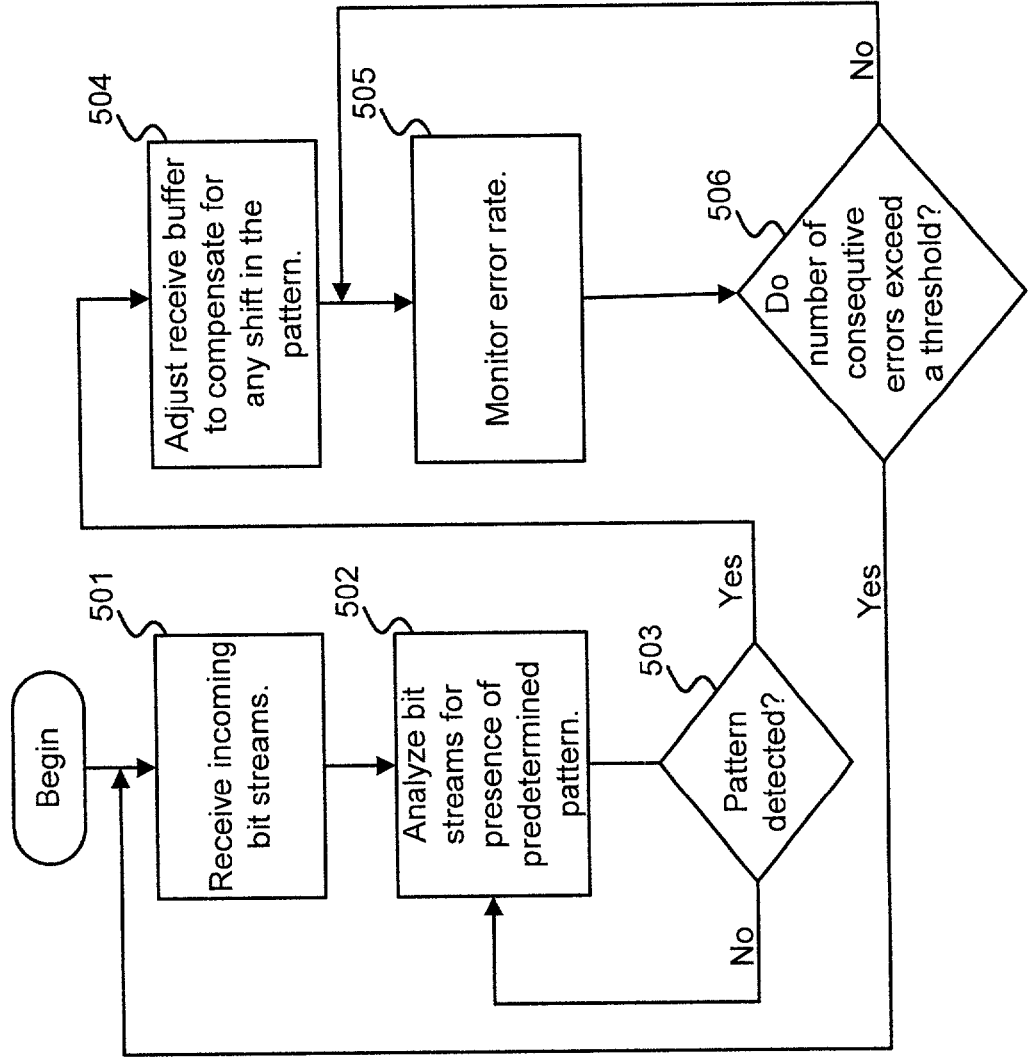
FIG. 5 is a flow chart illustrating methods associated with the alignment pattern shown in FIG. 4.

FIG. 5 is a flow chart illustrating operation of HSR 351 in processing alignment pattern 401. HSR 351 may being processing when a CRC error burst occurs that indicates an out-of-alignment condition. HSR 351 begins by receiving the incoming bit streams and analyzing the received bit streams for the presence of pattern 401. (Acts 501 and 502). Different ones of the bit streams may be received as shifted versions of the pattern. Accordingly, HSR 351 takes this fact into account when detecting the pattern 401. When the pattern is located, (Act 503), HSR 351 adjusts receive buffers within HSR 351 (not illustrated in FIG. 4) to compensate for any shift or transposition in the bit streams. (Act 504). Thus, for example, if the second bit stream is a cycle behind all of the other bit streams, HSR 351 may delete a bit in the buffer or double clock the buffer corresponding to the second bit stream to bring the second bit stream in alignment with the other bit streams. Acts 501 through 504 are repeated whenever the number of consecutive errors exceeds a threshold. (Acts 505 and 506). Errors may be detected through the CRC field.

As described above, consistent with the principles of the invention, data from a plurality of synchronous data links are serialized before being transmitted. A clock signal is not transmitted with the serialized data. Instead, a clock signal is generated at the receiving end of the optical link based on frequency and phase information embedded in the transmitted data.

The foregoing description of embodiments of the invention provides illustration and description, but is not intended to be exhaustive or to limit the invention to the precise form disclosed. Modifications and variations are possible in light of the above teachings or may be acquired from practice of the invention. Although described as being primarily implemented in hardware, the present invention may be embodied in hardware and/or in software (including firmware, resident software, micro-code, etc.).

The scope of the invention is defined by the claims and their equivalents.

What is claimed is:

1. A communication method comprising:
   receiving data from a first plurality of data lines, each data line providing data at a predetermined rate;
   serializing the received data;
   providing the serialized data over a link;
   deserializing the serialized data to create deserialized data using a clock signal having a phase determined based on edges in the serialized data that occur at least once every other cycle of the clock signal and that are generated by complementing a first data line of the first plurality of data lines to obtain a second data line of the first plurality of data lines; and
   providing the deserialized data to a second plurality of data lines corresponding to the first plurality of data lines.

2. The method of claim 1, wherein the act of serializing includes:
   multiplexing data from the first and the second of the first plurality of data lines onto a single data line clocked at a multiple of the predetermined rate.

3. The method of claim 1, wherein the link includes an optical fiber for carrying the serialized data.

4. The method of claim 1, further including:
   detecting a predetermined pattern in the deserialized data; and
   aligning the deserialized data with other data based on the detected pattern.

5. The method of claim 1, wherein the act of providing serialized data includes:
   transmitting the serialized data asynchronously through the link.

6. A communication system comprising:
   a plurality of input data signal lines carrying data transmitted synchronously with a first clock signal running at a predetermined frequency;
   a plurality of multiplexers each configured to receive a subset of the plurality of input data signal lines and to combine data received on the subset of data signal lines into combined signals, at least one of the plurality of multiplexers receiving, as the subset of the plurality of data signal lines, a first of the plurality of data signal lines and a complement of the first of the plurality of data signal lines;
   a transmission system coupled to the plurality of multiplexers and configured to transmit the combined signals;
   a plurality of demultiplexers configured to convert the combined signals to data signals on a plurality of output data signal lines based on a second clock signal; and
   a clock recovery circuit configured to provide the demultiplexers with the second clock signal based on the combined signals.

7. The communication system of claim 6, further comprising:
   an inverter connected to receive the first of the plurality of data signal lines and to output the complement of the first data signal line.

8. The communication system of claim 6, further comprising:
a transmitter configured to receive data from the plurality of input data signal lines and to transmit the data to the plurality of multiplexers, the transmitter periodically inserting a predetermined pattern into the data; and
a receiver configured to receive data from the plurality of data signal lines from the demultiplexers and to identify the predetermined pattern in the received data, the receiver aligning and correcting bit transpositions of the received data based on the predetermined pattern.

9. The communication system of claim 6, wherein each of the plurality of multiplexers combines the data signal lines into combined signals having a data transmission frequency which is a multiple of the predetermined frequency.

10. The communication system of claim 6, wherein the transmission system further includes:
transmitters connected to outputs of the multiplexers, the transmitters receiving the combined signals and transmitting the combined signals; and
receivers configured to receive the signals transmitted by the transmitters.

11. A network device for transmitting information over a link, the network device comprising:
a first multiplexer connected to a plurality of data lines each having an output, the first multiplexer combining data signals from the plurality of data lines;
a second multiplexer including a first input connected to the plurality of data lines, a second input connected to a line carrying a complement of data received by the first input, and an output, the second multiplexer combining data signals from the first and second inputs; and
transmitters connected to the outputs of the first and second multiplexers, the transmitters receiving the combined data signals from the first and second multiplexers and transmitting the combined data signals to a link.

12. The network device of claim 11, further comprising:
a circuit for receiving data for the plurality of data lines synchronously with a first clock signal running at a predetermined frequency.

13. The network device of claim 11, further comprising:
a circuit for transmitting a predetermined pattern on the plurality of data lines.

14. The network device of claim 11, wherein the network device is a router.

15. The network device of claim 11, wherein the line carrying a complement comprises:
an inverter outputting the complement of the data received by the first input of the second multiplexer.

16. A network device for receiving information, the network device comprising:
receivers connected to a link, the receivers receiving the information from the link and converting the information to first data signals and transmitting the data signals on data lines;
a first demultiplexer connected to the data lines, the first demultiplexer converting the first data signals into second and third data signals, and outputting the second data signal based on a clock signal and outputting the third data signal based on the clock signal, the third data signal being a complement of the second data signal; and
a clock recovery circuit connected to the data lines, the clock recovery circuit generating the clock signal based on a detection of repeating edges in the first data signals and providing the clock signal to the first demultiplexer.

17. The network device of claim 16, further comprising:
a second demultiplexer receiving the clock signal from the clock recovery circuit and outputting demultiplexed data signals.

18. The network device of claim 17, further comprising:
a receiver connected to receive data signals from at least the first or second demultiplexer, the receiver identifying a predetermined pattern in the received data signals and aligning data bits and correcting bit transpositions in the data signals based on the predetermined pattern.

19. The network device of claim 16, wherein the network device is a router.

20. A communication system comprising:
means for receiving data from a first plurality of data lines, each data line providing data at a predetermined rate;
means for serializing the received data;
a circuit for transmitting the serialized data;
means for generating a clock signal based on the serialized data by synchronizing a phase of the clock signal based on edges in the serialized data that occur at least once every other cycle of the clock signal and that are generated by complementing a first data line of the first plurality of data lines to obtain a second data line of the first plurality of data lines;
means for deserializing the serialized data using the clock signal to create deserialized data; and
means for providing the deserialized data to a second plurality of data lines.

21. The communication system of claim 20, wherein the means for serializing further comprises:
means for multiplexing data from the first and the second of the plurality of data lines onto a single data line at a rate different from the predetermined rate.

22. The communication system of claim 20, further comprising:
means for aligning the phase of a clock signal based on the serialized data.

23. The communication system of claim 20, further comprising:
an optical link for transmitting the serialized data.

24. The communication system of claim 20, further comprising:
means for detecting a predetermined pattern in the deserialized data; and
means for aligning data from the data lines based on the detected pattern.

25. The communication system of claim 20, wherein data on the first plurality of data lines is provided synchronously with a second clock signal and wherein the serialized data is provided asynchronously.

26. A network device for transmitting information over a link, the network device comprising:
a component configured to receive data signals at a predetermined rate and to output the data signals to a plurality of data lines, the component periodically inserting a predetermined pattern into the received data signals;
a plurality of multiplexers each connected to a subset of the plurality of data lines, the plurality of multiplexers combining data signals from the subset of the data lines;

an additional multiplexer including a first input connected to the plurality of data lines and a second input connected to a complement of the first input, the additional multiplexer combining data signals from the first and second inputs and generating an output; and transmitters connected to the plurality of multiplexers and the additional multiplexer, the transmitters receiving the combined data signals from the multiplexers and transmitting the combined data signals over the link.

27. The network device of claim 26, wherein the link is an optical link.

28. A network device for receiving information, the network device comprising:

receivers connected to a link, the receivers receiving the information from the link and converting the information to first data signals and transmitting the data signals on data lines;

a first demultiplexer connected to the data lines, the demultiplexer converting the first data signals into second and third data signals, and outputting the second data signal based on a clock signal and outputting the third data signal based on the clock signal;

a second demultiplexer connected to the data lines, the second demultiplexer converting the first data signals into fourth and fifth data signals, the fourth and fifth data signals being complements of one another;

a clock recovery circuit connected to the data lines, the clock recovery circuit generating the clock signal based on the first data signals and providing the clock signal to the first demultiplexer; and a receiver connected to receive the second and third data signals, the receiver analyzing the second and third data signals for the presence of a predetermined pattern, the receiver using the predetermined pattern to align bits and correct transposed bits in the second and third data signals.

29. The network device of claim 28, wherein the network device is a router.

* * * * *